No. 748,791. Patented January 5, 1904.

UNITED STATES PATENT OFFICE.

FRIEDRICH RIECHE AND OTTO SAAME, OF OESTRICH, GERMANY, ASSIGNORS TO THE FIRM OF RUDOLPH KOEPP & CO., OF OESTRICH, RHEINGAU, GERMANY.

PROCESS OF MAKING OXALATES.

SPECIFICATION forming part of Letters Patent No. 748,791, dated January 5, 1904.

Application filed May 9, 1903. Serial No. 156,439. (No specimens.)

*To all whom it may concern:*

Be it known that we, FRIEDRICH RIECHE and OTTO SAAME, both subjects of the German Emperor, residing and having our post-office address at 47 Landstrasse, Oestrich, Germany, have invented certain new and useful Improvements in the Manufacture of Oxalates, of which the following is a specification.

This invention relates to the preparation of oxalates by means of formiates.

Alkali formiates can by heating be converted into alkali oxalates, hydrogen being thereby liberated. (Merz and Wald, *Berichte der Deut. Chem. Ges.*, 15, 1507.) This reaction gives good yields only when small quantities are used, because in order to obtain good results it is necessary to rapidly heat to about 420° centigrade, and the temperature of 360° centigrade must be passed rapidly, and this is a great impediment to the treatment of large quantities. Attempts have been made to overcome these difficulties. If a large quantity of an inert body, such as carbonate of soda, be added to the formiate, (German patent No. 111,078,) or even if sodium oxalate be employed, a sufficient yield of oxalate is obtained without rapid heating; but the inert body must also pass through the whole process.

We have found that an inert substance, whether soda or sodium oxalate, is not necessary to obtain a smooth reaction and a yield approximating the theoretical yield and that it is sufficient that the reaction should be carried out in the presence of a body that converts the formiate into a thin liquid and also has a catalytic effect which starts the liberation of hydrogen. We have found that free alkalies act in this manner. If the formiate be heated in the presence of a very small percentage of free alkali, the mass at a temperature below the melting-point of the formiate becomes a liquid practically as thin as water, the reaction commencing at that temperature and once started proceeding smoothly and there is no need to trouble about the temperature. It has already been attempted to heat formiates in the presence of an alkali to transform them into oxalates, (Dumas and Stass, *Ann. d. Chem. Pharmacie*, 35-137; Erlenmeyer *Chemisches Centralblatt*, 68-420;) but the result has been unsatisfactory, for a large amount of carbonate of soda was obtained and but little oxalate, so that the whole process is useless commercially; but if in accordance with the present invention only a very small quantity of soda (five per cent. should not be exceeded) be added the hereinbefore-mentioned satisfactory result is obtained. With five per cent. the yield is less satisfactory than with one per cent., and even less than that is sufficient to insure proper reaction.

In the process according to this invention the use of large quantities of inert substances in the presence of the formiate is avoided, the reaction proceeds very smoothly and at a low temperature, and there is no need to trouble about temperature. The final product is a chemically-pure oxalate. Another great advantage of the said process is that the formiates obtained by the usual process contain a quantity of alkali sufficient for the process, and therefore can be at once converted into oxalates. The process may be conducted in either closed or open vessels and requires only apparatus of a simple character, occupying but little space, and there is considerable saving of fuel.

The following is an example of how the invention may be practically carried out; but the invention is not limited to the precise details of this example.

Ten kilograms of sodium formiate and one hundred grams of caustic soda are heated in an open vessel. The mass melts, and at about 290° centigrade hydrogen is briskly and uniformly evolved. The liquid becomes readily solidified as oxalate is formed, and when the temperature is about 360° centigrade the vessel contains chemically-pure, porous, and white oxalate. The reaction takes place so rapidly that stirring is not absolutely necessary, and the operation is completed in about half an hour.

Instead of the alkali mentioned other bodies which will act in small quantities on the formiates and convert them into thin liquid or act as a flux while hydrogen is evolved may be used.

Instead of free alkali a compound may be added which at about 300° centigrade yields free alkali. Owing to the small amount of alkali, and consequently of such compound, required in the process, the impurities present in the final product will be so small as not to be objectionable.

We claim—

The herein-described process of manufacturing oxalates by means of formiates by heating the latter in the presence of a small quantity of a free alkali not exceeding five per cent. as and for the purpose set forth.

In testimony whereof we have signed our names to this specification in the presence of two subscribing witnesses.

FRIEDRICH RIECHE.
OTTO SAAME.

Witnesses:
FRANZ HASSLACHER,
MICHAEL VOLK.